United States Patent

Merz et al.

[11] 3,917,606
[45] *Nov. 4, 1975

[54] N-THIENYLMETHYL-BENZOMORPHANS AND -MORPHINANS AND SALTS THEREOF

[75] Inventors: Herbert Merz; Adolf Langbein; Klaus Stockhaus; Helmut Wick, all of Ingelheim am Rhein, Germany

[73] Assignee: Boehringer Ingelheim GmbH, Ingelheim am Rhein, Germany

[ * ] Notice: The portion of the term of this patent subsequent to July 9, 1991, has been disclaimed.

[22] Filed: Apr. 2, 1973

[21] Appl. No.: 347,158

[30] Foreign Application Priority Data
Apr. 12, 1972   Germany............................ 2217420

[52] U.S. Cl. ..... 260/285; 260/293.54; 260/DIG. 13; 424/267
[51] Int. Cl.$^2$................ C07D 221/26; C07D 221/28
[58] Field of Search........................ 260/293.54, 285

[56] References Cited
UNITED STATES PATENTS
2,924,603   2/1960   Gordon et al..................... 260/293.4
3,647,806   3/1972   Cross............................. 260/293.54

Primary Examiner—G. Thomas Todd
Attorney, Agent, or Firm—Hammond & Littell

[57] ABSTRACT

Compounds of the formula

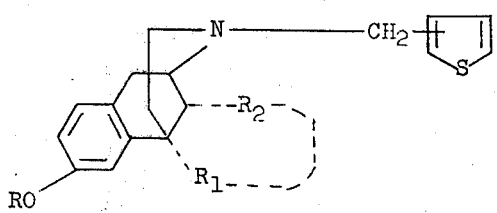

wherein
  R is hydrogen, methyl or acetyl, and
  $R_1$ and $R_2$ are each hydrogen, methyl, ethyl, n-propyl or isopropyl, or, together with each other, 1,4-butylene,
and non-toxic, pharmacologically acceptable acid addition salts thereof; the compounds as well as their salts are useful as opiate antagonists, analgesics and antitussives.

10 Claims, No Drawings

N-THIENYLMETHYL-BENZOMORPHANS AND -MORPHINANS AND SALTS THEREOF

This invention relates to novel N-thienylmethylbenzomorphans and -morphinans and acid addition salts thereof, as well as to various methods of preparing these compounds.

More particularly, the present invention relates to a novel class of benzomorphans and morphinans represented by the formula

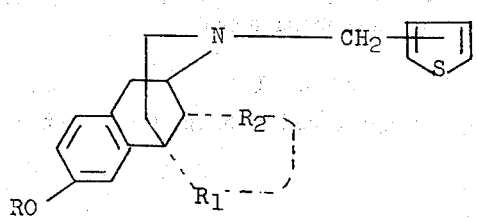

(I)

wherein
R is hydrogen, methyl or acetyl, and
$R_1$ and $R_2$ are each hydrogen, methyl, ethyl, n-propyl or isopropyl, or, together with each other, 1,4-butylene,
and non-toxic, pharmacologically acceptable acid addition salts thereof.

A preferred sub-genus thereunder is constituted by compounds of the formula

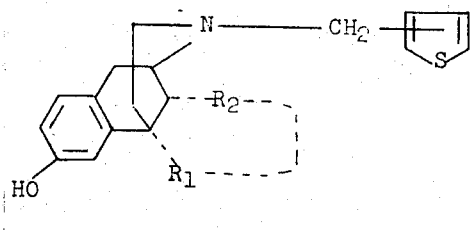

(Ia)

wherein $R_1$ and $R_2$ have the same meanings as in formula I, and their non-toxic, pharmacologically acceptable acid addition salts.

The compounds embraced by formula I may be prepared by a number of different methods, among which the following are most convenient and efficient:

Method A

By the process represented by the reaction sequence

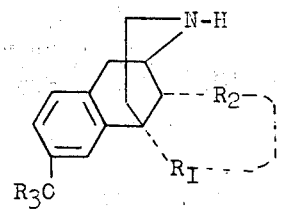 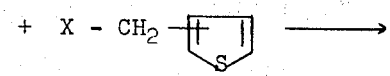

(II)        (III)

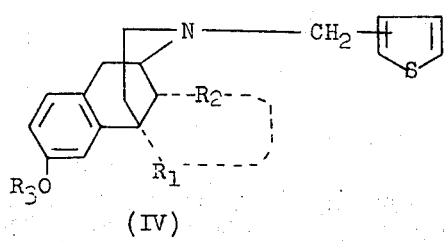

(IV)

if $R_3 \neq R$

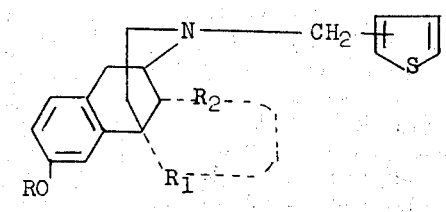

(I)

where
R, $R_1$ and $R_2$ have the meanings previously defined,
$R_3$ is alkyl, aralkyl or acyl, and
X is halogen, preferably chlorine or bromine, alkyl—$SO_2$—O—, aryl—$SO_2$—O— or $(CH_3)_3$—N—.

Thus, this particular method consists of reacting a benzomorphan or morphinan of the formula II with a thienylmethyl derivative of the formula III to form an N-thienylmethylbenzomorphan or -morphinan of the formula IV; thereafter, if desired, de-alkylating or de-acylating the compound of the formula IV to form a compound of the formula I wherein R is hydrogen; and subsequently, if desired, methylating or acetylating the compound of the formula I wherein R is hydrogen to obtain the corresponding compound wherein R is methyl or acetyl.

The reaction of the benzomorphan or morphinan of the formula II is performed with the calculated amount, or a slight excess thereover, of the thionylmethyl derivative of the formula III, optionally in the presence of an acid-binding agent. Examples of suitable acid-binding agents are tertiary amines, such as triethylamine or N,N-dicyclohexylethylamine; alkali metal carbonates, such as sodium carbonate or potassium carbonate; alkali metal bicarbonates, preferably sodium bicarbonate; or alkali metal hydroxides or oxides. The reaction is advantageously carried out in an inert organic solvent medium, such as tetrahydrofuran, dioxane, methylene chloride, dimethylformamide, dimethylsulfoxide or a mixture of two or more of these, preferably mixtures of tetrahydrofuran and dimethylformamide. The reaction temperature may vary within wide limits, but a temperature between 0°C and the boiling point of the particular solvent medium which is used is preferred. After completion of the respective reactions, the reaction products are isolated and crystallized by conventional methods.

Method B

By the process represented by the reaction sequence

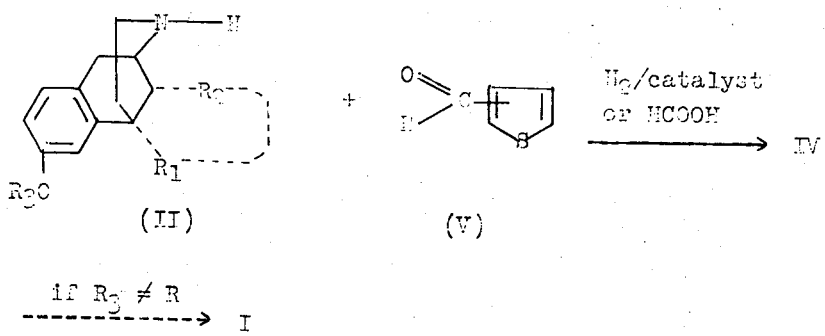

where $R_1$, $R_2$ and $R_3$ have the meanings previously defined, that is, by reacting a compound of the formula II with a thiophenaldehyde of the formula V in the presence of catalytically activated hydrogen or formic acid to form a compound of the formula IV; thereafter, if desired, in order to produce a compound of the formula I wherein R is hydrogen, de-alkylating or de-acylating a compound of the formula IV; and, if desired, in order to produce a compound of the formula I wherein R is methyl or acetyl, methylating or acetylating a compound of the formula I, wherein R is hydrogen.

In reductive alkylation step in the presence of catalytically activated hydrogen, the aldehyde V is used in the calculated quantity or in excess, preferably up to 2 mols of aldehyde per mol of compound of the formula II. The reaction is performed in a suitable solvent, such as an alcohol, preferably in methanol or ethanol. Various hydrogenation catalysts may be used, such as Raney nickel or similar catalysts, or pure metal catalysts, especially palladium or platinum contacts. The latter may be used in finely dispersed form, in the free state or deposited on carriers, such as charcoal, barium sulfate, calcium carbonate, diatomateous earth or the like. If required, in order to avoid side-reactions, the activity of the catalysts may be attenuated, for instance by sulfidation. The quantity of catalyst is not critical and may therefore be varied in wide limits. The hydrogenation is advantageously effected while stirring or shaking at normal pressure or slightly elevated pressure, preferably at 1 to 3 atmospheres. High reaction temperatures favor side-reactions; therefore, the reaction is preferably performed at room temperature or only slightly elevated temperature up to about 60°C. The reaction products are isolated and crystallized by conventional methods.

The reaction of a compound of the formula II with an aldehyde of the formula V in the presence of formic acid may be effected in aqueous solution, as well as suitable organic solvents or mixtures of solvents. The aldehyde of the formula V is used in calculated quantity or in excess, preferably up to 1.5 mols of aldehyde per mol of compound of the formula II. The formic acid is advantageously provided in excess. The reaction is carried out at temperatures between 50° and 200°C, preferably between 80° and 150°C. The reaction product is isolated by conventional methods.

Method C

By the process represented by the reaction sequence

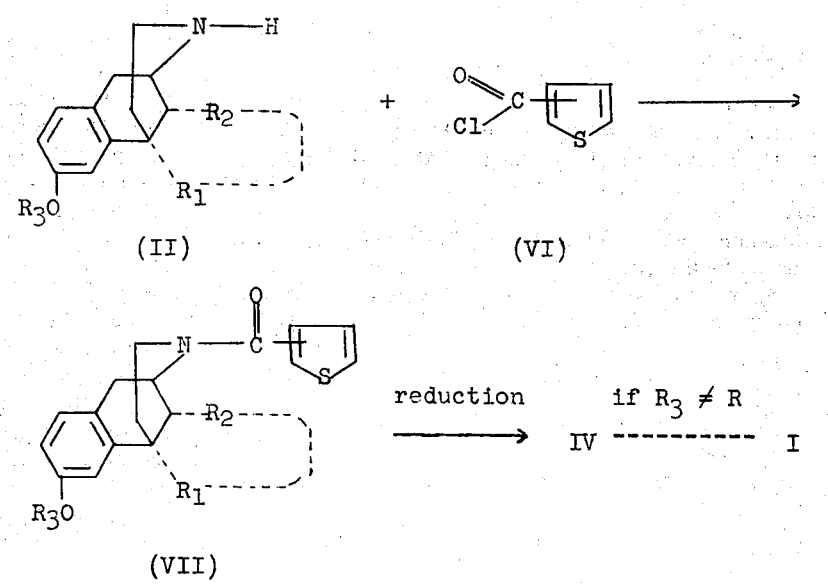

where $R_1$, $R_2$ and $R_3$ have the meanings previously defined, that is, by reacting a compound of the formula II with a thiophene-carboxylic acid chloride of the formula VI to form a compound of the formula IV; thereafter, if desired, in order to produce a compound of the formula I wherein R is hydrogen, de-alkylating or de-acylating a compound of the formula IV; and, if desired, in order to produce a compound of the formula I wherein R is methyl or acetyl, methylating or acetylating a compound of the formula I, wherein R is hydrogen.

preferred. During reduction of the N,O-dithenoyl derivative of the formula VII with a complex metal hydride, the O-acyl group is split off simultaneously with the reduction of the carbonyl group, and in this case a compound of the formula I is obtained, wherein R is hydrogen. The reaction product is isolated and crystallized by conventional methods.

Method D

By the process represented by the reaction sequence

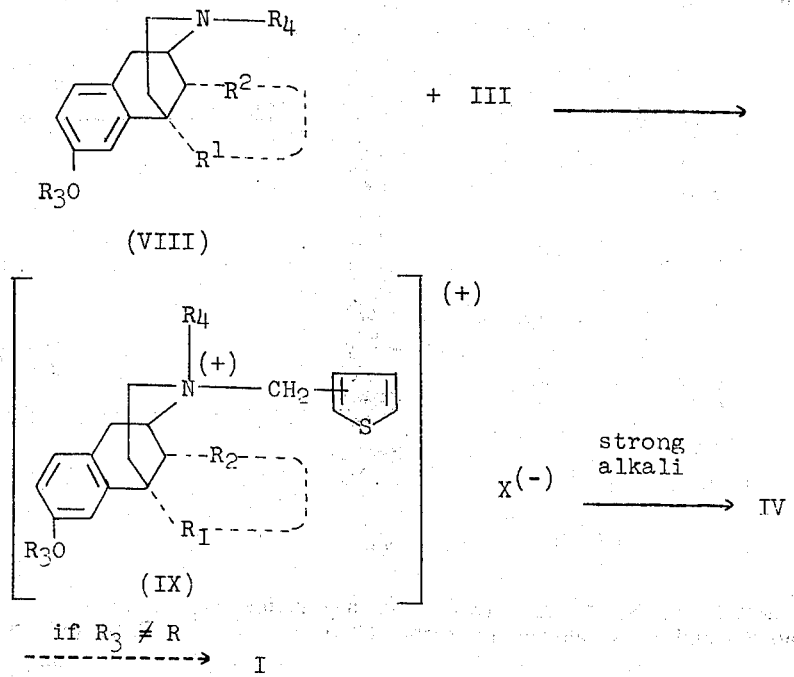

The first reaction step is effected according to the Schotten-Baumann method under formation of an amide of formula VII. When the reaction is performed with a compound of the formula II wherein $R_3$ is hydrogen and 2 mols of an acid chloride of the formula VI is used, the reaction product is an N,O-dithenoyl derivate of the formula VII, when $R_3$ is thenoyl.

In the second step of this process the carboxylic acid amide of the formula VII is reduced to a compound of the formula IV. Among the various suitable reduction methods, the reduction with a complex hydride, in particular with lithium aluminum hydride is preferably used. Either the calculated quantity or, preferably, an excess of the hydride, advantageously up to double the calculated quantity is provided. The reduction is advantageously performed in a suitable inert solvent or solvent mixture, such as ethers, but preferably in tetrahydrofuran. The reaction temperature is variable within wide limits. Temperatures between 0°C and the boiling point of the solvent or mixture of solvents are where R, $R_1$, $R_2$, $R_3$ and X have the meanings defined above, and $R_4$ is a substituent easily removable by the Hoffman-elimination, preferably phenethyl, 1,2-diphenylethyl or naphthylethyl.

Thus, the process of this method consists of reacting a compound of the formula VIII with a thienylmethyl derivative of the formula III to form a quaternary ammonium salt of the formula IX; conversion thereof by means of the Hoffmann-elimination into a compound of the formula IV; thereafter, if desired, in order to produce a compound of the formula I wherein R is hydrogen, de-alkylating a compound of the formula IV wherein $R_3$ is alkyl or aralkyl; and, if desired, in order to produce a compound of the formula I wherein R is methyl or acetyl, methylating or acetylating a compound of the formula I wherein R is hydrogen.

Method E

By the process represented by the reaction sequence

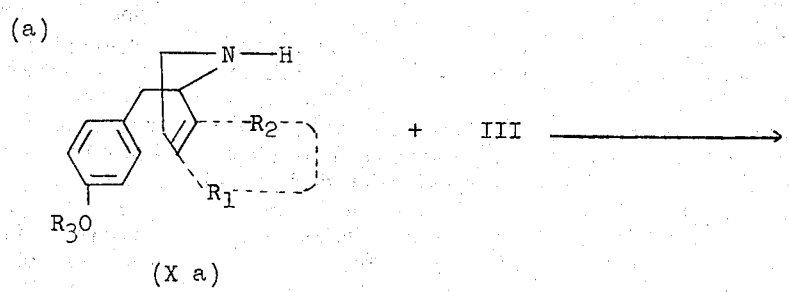

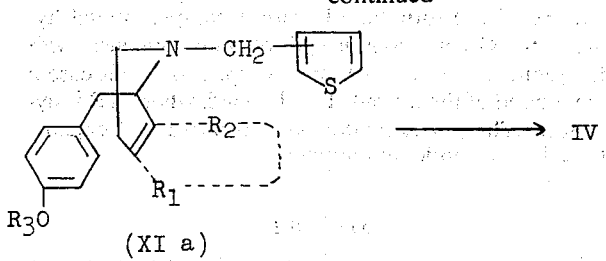

(XI a)

or (b)

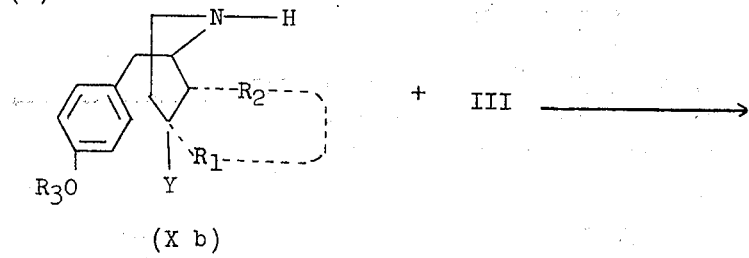

(X b)

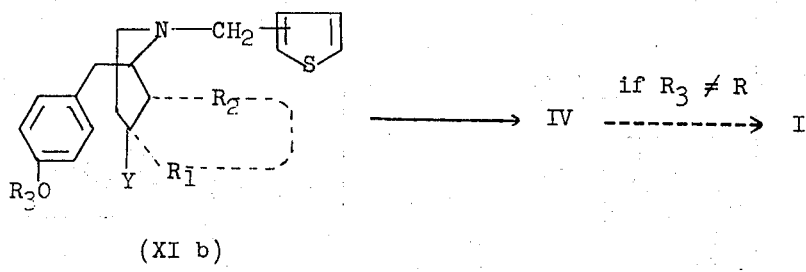

(XI b)

where R, $R_1$, $R_2$ and $R_3$ have the meanings defined above, and Y is halogen, preferably Cl or Br, alkyl—O—, acyl—O—, alkyl—$SO_2$—O, aryl—$SO_2$—O— or OH.

Thus, the process of this method consists of reacting a compound of the formula Xa or Xb with a thienylmethyl derivative of the formula III to form an uncyclized intermediate of the formula XIa or XIb; cyclizing the latter to form a compound of the formula IV; thereafter, if required, in order to produce a compound of the formula I wherein R is hydrogen, de-alkylating or de-acylating a compound of the formula IV; and, if required, in order to produce a compound of the formula I wherein R is methyl or acetyl, methylating or acetylating a compound of the formula I wherein R is hydrogen.

The cyclization reaction is effected by conventional methods, for example, using catalysts of the Friedel-Crafts type, in an inert solvent, or with a strong acid, such as concentrated hydrobromic acid, hydrogen bromide/glacial acetic acid, phosphoric acid, polyphosphoric acid or the like. The temperature at which cyclization can be effected varies within wide limits, that is, from 0° to 150°C. The products are crystallized and isolated according to conventional methods.

Method F

By the process represented by the reaction sequence

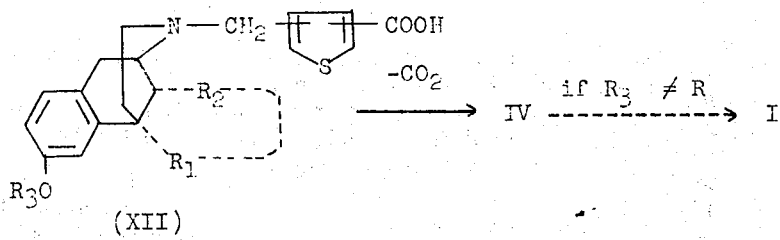

(XII)

where $R_1$, $R_2$ and $R_3$ have the meanings previously defined, that is, by decarboxylating a compound of the formula XI to form a compound of the formula IV; thereafter, if desired, for production of a compound of the formula I wherein R is hydrogen, de-alkylating or de-acylating a compound of the formula IV; and, if desired, to obtain a compound of the formula I wherein R is methyl or acetyl, methylating or acetylating a compound of the formula I wherein R is hydrogen.

The starting compounds needed for methods A through F are either known or may be prepared by conventional methods. The methods of preparation described above may be carried out with racemic as well as with optically active starting compounds; in the latter case optically active end products are obtained. On the other hand, racemates or racemic mixtures of the end products of the formula I may be separated into optical antipodes according to conventional methods described in the literature.

The compounds of the formula I are bases and therefore form acid addition salts with inorganic or organic acids. Examples of non-toxic, pharmacologically acceptable acid addition salts are those formed with hydrochloric acid, hydrobromic acid, hydroiodic acid, hydrofluoric acid, sulfuric acid, phosphoric acid, nitric acid, acetic acid, propionic acid, butyric acid, valeric acid, pivalic acid, caproic acid, oxalic acid, malonic acid, succinic acid, maleic acid, fumaric acid, lactic acid, tartaric acid, citric acid, malic acid, benzoic acid, phthalic acid, cinnamic acid, salicylic acid, ascorbic acid, 8-chlorotheophylline, methanesulfonic acid or the like.

Substituents $R_1$ and $R_2$ in formulas I and Ia are in cis-configuration with respect to each other, wherefor the compounds are optically active. The present invention embraces optically inactive racemates or racemic mixtures, as well as the pure optical isomers of these compounds.

The following examples further illustrate the present invention and will enable others skilled in the art to understand it more completely. It should be understood, however, that the invention is not limited solely to the particular examples given below.

EXAMPLE 1

2-(3-Thienylmethyl)-2'-hydroxy-5,9α-dimethyl-6,7-benzomorphan and its hydrochloride by method A A mixture consisting of 2.17 gm (0.01 mol) of 2'-hydroxy-5,9α-dimethyl-6,7-benzomorphan, 1.26 gm (0.015 mol) of sodium bicarbonate, 1.95 gm (0.011 mol) of 3-(bromo-methyl)-thiophene, 15 ml of dimethylformamide and 25 ml of tetrahydrofuran was refluxed for 2 hours, accompanied by stirring. Thereafter, the reaction mixture was evaporated in vacuo, and the residue was shaken with a mixture consisting of 50 ml of chloroform and 25 ml of water. The chloroform phase was separated, washed with water, dried over sodium sulfate and evaporated. The residue, 2-(3-thienylmethyl)-2'-hydroxy-5,9α-dimethyl-6,7-benzomorphan, was dissolved in about 20 ml of absolute ethanol, the solution was acidified with 5 ml of 2 N hydrochloric acid, and then absolute ether was added until the solution just began to turn cloudy. After standing overnight in a refrigerator, the crystalline substance which had separated out was collected by vacuum filtration, washed first with ethanol/ether (1:1) and then with ether, and finally dried at 80°C, yielding 2.9 gm (83% of theory) of the hydrochloride of the formula

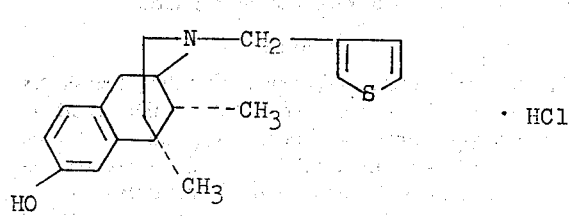

· HCl which had a melting point of 258°–260°C. The melting point of a sample which was recrystallized from ethanol/ether remained unchanged at 258°–260°C.

EXAMPLE 2

(−)-N-(2-Thienylmethyl)-3-hydroxy-morphinan and its methanesulfonate by method A a. A mixture consisting of 9.7 gm (0.04 mol) of (−)-3-hydroxy-morphinan, 5 gm of sodium bicarbonate, 5.9 gm (0.044 mol) of 2-chloromethyl-thiophene, 45 ml of dimethylformamide and 75 ml of tetrahydrofuran was refluxed for 2 hours. Thereafter, the reaction mixture was evaporated, and the residue was shaken with a mixture consisting of 180 ml of chloroform, 20 ml of n-butanol and 100 ml of water. The organic phase was separated, washed with water, dried with sodium sulfate and evaporated in vacuo, and the residue was stirred with 50 ml of acetone, whereupon it crystallized. The crystals were collected by vacuum filtration, washed with acetone and dried at 80°C, yielding 12.5 gm (92.5% of theory) of the free base of the formula

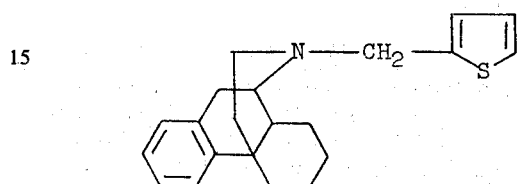

which had a melting point of 220°–225°C.

b. The crystalline base was dissolved in about 75 ml of methanol by adding 4.0 gm of methanesulfonic acid, absolute ether was added to the resulting solution until it just began to turn cloudy, and the mixture was allowed to stand overnight in a refrigerator. The substance which had crystallized out during that time was collected by vacuum filtration, washed first with methanol/ether (1:2) and then with absolute ether, and dried at 80°C. 15.5 gm (97% of theory, based on 9.7 gm of starting material) of (−)-N-(2-thienylmethyl)-3-hydroxy-morphinan methanesulfonate was obtained, whose melting point of 144°C remained unchanged after recrystallization from methanol/ether.

EXAMPLE 3

(+)-2-(3-Thienylmethyl)-2'-hydroxy-5,9α-dimethyl-6,7-benzomorphan methanesulfonate by method A 2.17 gm (0.01 mol) of (+)-2'-hydroxy-5,9α-dimethyl-6,7-benzomorphan were reacted with 3-chloromethyl-thiophene in a manner analogous to that described in Example 2(a). The residue of the organic phase evaporation was directly, i.e. without isolation of the free base, dissolved in about 20 ml of ethanol by adding 1.0 gm of methanesulfonic acid thereto, and the resulting solution was admixed with ether until it began to turn cloudy. The crystalline substance which separated out was isolated in a manner analogous to that described in Example 2(b), yielding 3.3 gm (81.0% of theory) of (+)-2-(3-thienylmethyl)-2'-hydroxy-5,9α-dimethyl-6,7-benzomorphan methanesulfonate having a melting point of 206°C. The melting point of a sample recrystallized from ethanol/ether remained unchanged at 206°C.

EXAMPLE 4

(+)-N-(2-Thienylmethyl)-3-hydroxy-morphinan by method A

A mixture consisting of 2.34 gm (0.01 mol) of (+)-3-hydroxy-morphinan, 8.4 gm of 2-thienyl-trimethylammonium iodide and 5 ml of dimethylformamide was heated for 1 hour on an oil bath at 150°C. Thereafter, the reaction mixture was evaporated in vacuo, and the residue was shaken with a mixture consisting of 50 ml of chloroform, 25 ml of water and 5 ml of concentrated ammonia. The chloroform phase was separated, washed twice with 20 ml of water each, dried with sodium sulfate and evaporated in vacuo. The residue was redissolved in 25 ml of chloroform, and the solution was chromatographed on 50 gm of aluminum oxide (neutral, activity stage III). After elution with chloroform, the eluate fractions were thin-layer-chromatographically analized, and those containing the pure desired end product were combined and evaporated. The residue crystallized upon being treated with acetone. The crystalline substance was collected and dried, yielding 1.8 gm (53.5% of theory) of (+)-N-(2-thienylmethyl)-3-hydroxy-morphinan having a melting point of 213°–214°C.

EXAMPLE 5

Using a procedure analogous to that described in Example 2(a), 54.5% of theory of (−)-N-(2-thienylmethyl)-3-hydroxy-morphinan, m.p. 214°C, was obtained from (−)-3-hydroxy-morphinan and 2-chloromethyl-thiophene.

EXAMPLE 6

Using a procedure analogous to that described in Example 2(a), 76.5% of theory of (±)-N-(3-thienylmethyl)-3-hydroxy-morphinan, m.p. 231°C, was obtained from (±)-3-hydroxy-morphinan and 3-chloromethyl-thiophene.

EXAMPLE 7

Using a procedure analogous to that described in Example 2(a), 78.5% of theory of (−)-N-(3-thienylmethyl)-3-hydroxy-morphinan, m.p. 250°C, was obtained from (−)-3-hydroxy-morphinan and 3-chloromethyl-thiophene.

EXAMPLE 8

Using a procedure analogous to that described in Example 3, 93.0% of theory of (+)-2-(2-thienylmethyl)-2'-hydroxy-5,9α-dimethyl-6,7-benzomorphane methanesulfonate, m.p. 256°–257°C, were obtained from (+)-2'-hydroxy-5,9α-dimethyl-6,7-benzomorphan and 2-bromomethyl-thiophene.

EXAMPLE 9

Using a procedure analogous to that described in Example 1, 60.5% of theory of (±)-2-(3-thienylmethyl)-2'-hydroxy-5-methyl-9α-ethyl-6,7-benzomorphan hydrochloride, m.p. 242°C, of the formula

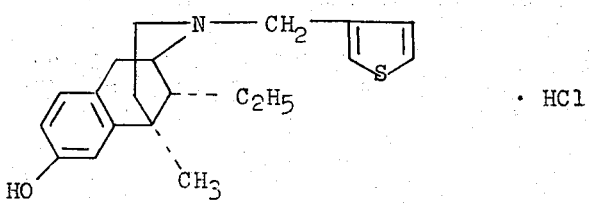

was obtained from (±)-2'-hydroxy-5-methyl-9α-ethyl-6,7-benzomorphan and 3-bromomethyl-thiophene.

EXAMPLE 10

Using a procedure analogous to that described in Example 1, 60.5% of theory of (±)-2-(3-thienylmethyl)-2'-hydroxy-5-ethyl-9α-methyl-6,7-benzomorphan hydrochloride, m.p. 286°–288°C, was obtained from (±)-2'-hydroxy-5-ethyl-9α-methyl-6,7-benzomorphan and 3-bromomethyl-thiophene.

EXAMPLE 11

Using a procedure analogous to that described in Example 1, 82.0% of theory of (±)-2-(2-thienylmethyl)-2'-hydroxy-5,9α-diethyl-6,7-benzomorphan hydrochloride, m.p. 261°C, was obtained from (±)-2'-hydroxy-5,9α-diethyl-6,7-benzomorphan and 2-bromomethyl-thiophene.

EXAMPLE 12

Using a procedure analogous to that described in Example 1, 73.0% of theory of (±)-2-(2-thienylmethyl)-2'-hydroxy-5-methyl-6,7-benzomorphan hydrochloride, m.p. 190°C, of the formula

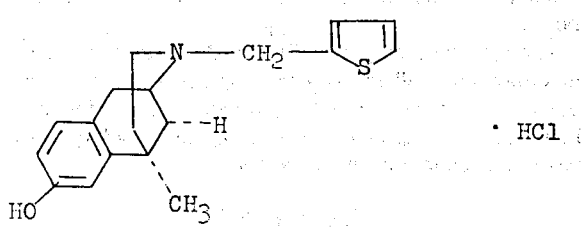

was obtained from (±)-2'-hydroxy-5-methyl-6,7-benzomorphan and 2-bromomethyl-thiophene.

EXAMPLE 13

Using a procedure analogous to that described in Example 1, 40.0% of theory of (±)-2-(3-thienylmethyl)-2'-hydroxy-5-methyl-6,7-benzomorphan, m.p. 170°–171°C, was obtained from (±)-2'-hydroxy-5-methyl-6,7-benzomorphan and 3-bromomethyl-thiophene.

EXAMPLE 14

Using a procedure analogous to that described in Example 1, 71.0% of theory of (±)-2-(2-thienylmethyl)-2'-hydroxy-5-ethyl-6,7-benzomorphan hydrochloride, m.p. 200°C, was obtained from (±)-2'-hydroxy-5-ethyl-6,7-benzomorphan and 2-bromomethyl-thiophene.

EXAMPLE 15

Using a procedure analogous to that described in Example 1, 66.5% of theory of (±)-2-(2-thienylmethyl)-2'-hydroxy-5-n-propyl-6,7-benzomorphan, m.p. 165°C, was obtained from (±)-2'-hydroxy-5-n-propyl-6,7-benzomorphan and 2-bromomethyl-thiophene.

EXAMPLE 16

Using a procedure analogous to that described in Example 1, 80.0% of theory of (±)-2-(3-thienylmethyl)-2'-hydroxy-5-n-propyl-6,7-benzomorphan, m.p. 178°–179°C, was obtained from (±)-2'-hydroxy-5-n-propyl-6,7-benzomorphan and 3-bromomethyl-thiophene.

EXAMPLE 17

Using a procedure analogous to that described in Example 1, 54.0% of theory of (±)-2-(3-thienylmethyl)-2'-hydroxy-5-isopropyl-6,7-benzomorphan, m.p. 208°–212°C, was obtained from (±)-2'-hydroxy-5-isopropyl-6,7-benzomorphan and 3-bromomethyl-thiophene.

EXAMPLE 18

Using a procedure analogous to that described in Example 3, 52.0% of theory of (±)-2-(2-thienylmethyl)-2'-hydroxy-5-isopropyl-6,7-benzomorphan methanesulfonate, m.p. 188°–192°C, was obtained from (±)-2'-hydroxy-5-isopropyl-6,7-benzomorphan and 2-bromomethyl-thiophene.

EXAMPLE 19

Using a procedure analogous to that described in Example 1, 53.0% of theory of (±)-2-(3-thienylmethyl)-2'-hydroxy-6,7-benzomorphan, m.p. 169°C, of the formula

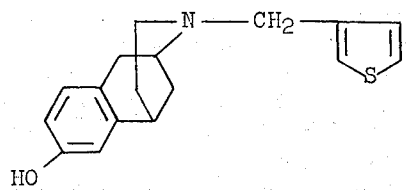

was obtained from (±)-2'-hydroxy-6,7-benzomorphan and 3-bromomethyl-thiophene.

EXAMPLE 20

2-(2-Thienylmethyl)-2'-hydroxy-5,9α-dimethyl-6,7-benzomorphan hydrochloride by method B 2.17 gm (0.01 mol) of 2'-hydroxy-5,9α-dimethyl-6,7-benzomorphan and 2.6 gm of freshly distilled thiophene-2-aldehyde were dissolved in 120 ml of methanol, and the resulting solution was hydrogenated at 20°C and atmospheric pressure in the presence of about 1 gm of Raney nickel, accompanied by shaking. The hydrogenation was discontinued after ten hours or absorption of 300 ml of hydrogen, the catalyst was filtered off, and the filtrate was evaporated in vacuo. The yellowish-brown residue was taken up in 25 ml of chloroform, and the solution was chromatographed on a column charged with 75 gm of aluminum oxide (activity stage III), using chloroform as the eluent. After an intensely yellow preliminary fraction, the desired reaction product began to appear in the eluate. The column was now eluted further with chloroform/methanol (98:2), and the eluate fractions containing the pure reaction product, as determined by thin-layer chromatography, were combined and evaporated in vacuo. The free base residue was crystallized as its hydrochloride from ethanol/ether analogous to Example 1, yielding 0.45 gm (12.9% of theory) of the hydrochloride of 2-(2-thienylmethyl)-2'-hydroxy-5,9α-dimethyl-6,7-benzomorphan having a melting point of 255°–257°C. After recrystallization from ethanol/ether it had a melting point of 258°–259°C.

EXAMPLE 21

(−)-2-(2-Thienylmethyl)-2'-hydrocy-5,9α-dimethyl-6,7-benzomorphan methanesulfonate by method B A mixture consisting of 2.17 gm (0.01 mol) of (−)-2'-hydroxy-5,9α-dimethyl-6,7-benzomorphan and 1.0 gm (0.02 mol) of 98% formic acid was heated and stirred for about 15 minutes on an oil bath at 150°C to form a homogeneous melt. 1.25 gm (0.011 mol) of thiophene-2-aldehyde were now added to the melt, and the mixture was refluxed for 30 minutes at 150°C. Thereafter, 25 ml of water and 25 ml of 2 N hydrochloric acid were added, and the mixture was heated to the boiling point and transferred to a separating funnel, the reaction vessel being rinsed with hot water. After cooling, the mixture was made alkaline with concentrated ammonia and was then extracted with 50 ml of chloroform and once again with 25 ml of chloroform. The combined chloroform extracts were washed with water, dried with sodium sulfate and evaporated in vacuo, and the free base residue was crystallized as its methanesulfonate analogous to Example 3. 3.1 gm (75.5% of theory) of (−)-2-(2-thienylmethyl)-2'-hydroxy-5,9α-dimethyl-6,7-benzomorphan methanesulfonate, m.p. 254°–255°C, were obtained. A sample recrystallized from ethanol/ether had a melting point of 256°–257°C.

EXAMPLE 22

N-(2-Thienylmethyl)-3-hydroxy-morphinan by method C 2.43 gm (0.01 mol) of 3-hydroxy-morphinan were dissolved in 35 ml of hot methanol, the hot solution was admixed with a solution of 2.5 gm of potassium carbonate in 4 ml of water, the mixed solution was allowed to cool to 20°C, and 1.6 gm (0.011 mol) of thiophene-2-carboxylic acid were added over a period of 10 minutes while stirring, and the mixture was stirred for 1 hour at room temperature. Thereafter, the methanol was distilled off in vacuo, the residue was shaken with a mixture consisting of 50 ml of chloroform and 25 ml of water, and the chloroform phase was separated, washed with water, dried with sodium sulfate and evaporated in vacuo. The residue was redissolved in 50 ml of absolute benzene, and the resulting solution was again evaporated.

The residue, consisting of N-(2-thenoyl)-3-hydroxymorphinan, was dissolved in 50 ml of absolute tetrahydrofuran, and the resulting solution was added dropwise to a suspension of 0.76 gm (0.02 mol) of lithium aluminum hydride in 25 ml of absolute tetrahydrofuran at about 10°C, while stirring and cooling. The reaction mixture was then refluxed for 2 hours while stirring. Thereafter, the reaction mixture was placed on an ice bath and, while vigorously stirring, 1.5 ml of water were added dropwise, and subsequently the mixture was admixed with 75 ml of an aqueous saturated ammonium tartrate solution, and the resulting mixture was stirred for 1 hour. Thereafter, the tetrahydrofuran (upper) phase was separated and evaporated. The aqueous phase was extracted 3 times with chloroform, the residue from the evaporation of the tetrahydrofuran solution was dissolved in the combined chloroform extracts, and the resulting solution was washed with water, dried with sodium sulfate and evaporated. The residue was crystallized from about 50 ml of ethyl acetate, yielding 2.6 gm (76.5% of theory) of N-(2-thienylmethyl)-3-hydroxymorphinan having a melting point of 189°–191°C.

EXAMPLE 23

2-(2-Thienylmethyl)-2'-hydroxy-5-ethyl-9α-methyl-6,7-benzomorphan hydrochloride by method C 2.33 gm (0.01 mol) of 2'-hydroxy-5-ethyl-9α-methyl-6,7-benzomorphan were suspended in 25 ml of absolute methylene chloride, 4 ml of triethylamine were added, the resulting solution was admixed over a period of 1 hour with a solution of 3.2 gm (0.022 mol) of thiophene-2-carboxylic acid chloride in 10 ml of absolute methylene chloride, accompanied by stirring, and the mixed solution was refluxed for 4 hours. Thereafter, the reaction solution was washed, in the presence of ice, twice with 10 ml of 2 N hydrochloric acid each and then three times with water, dried with sodium sulfate and evaporated in vacuo. The residue, consisting of N,O-di-(2-thenoyl)-2′-hydroxy-5-ethyl-9α-methyl-6,7-benzomorphan, was dissolved in 75 ml of absolute tetrahydrofuran, and the resulting solution was added dropwise to a suspension of 0.76 gm (0.02 mol) of lithium aluminum hydride at about 10°C, accompanied by stirring and cooling. The reaction mixture was refluxed for 2 hours, while stirring, and then worked up as described in Example 22. The evaporation residue of the chloroform solution was reprecipitated as the hydrochloride analogous to Example 3, yielding 82.0% of theory of 2-(2-thienylmethyl)-2′-hydroxy-5-ethyl-9α-methyl-6,7-benzomorphan hydrochloride having a melting point of 274°–276°C.

EXAMPLE 24

(−)-2-(3-Thienylmethyl)-2′-hydroxy-5,9α-dimethyl-6,7-benzomorphane methanesulfonate 0.5 gm of (−)-2-(3-thienylmethyl)-2′-acetoxy-5,9α-dimethyl-6,7-benzomorphan hydrochloride, prepared from (−)-2-(3-thienylmethyl)-2′-hydroxy-5,9α-dimethyl-6,7-benzomorphan hydrochloride in a manner analogous to that described in Example 26, were dissolved in 15 ml of methanol, 10 ml of 2 N hydrochloric acid were added to the solution, and the mixture was refluxed for 30 minutes. Thereafter, the reaction solution was evaporated in vacuo, and the residue was shaken with a mixture consisting of 25 ml of 2 N ammonia and 50 ml of chloroform. The chloroform phase was separated, and the aqueous phase was again extracted with chloroform. The combined chloroform solutions were washed with water, dried with sodium sulfate and evaporated in vacuo, and the residue was crystallized with methanesulfonic acid as described in Example 3, yielding 0.45 gm (86.0% of theory) of (−)-2-(3-thienylmethyl)-2′-hydroxy-5,9α-dimethyl-6,7-benzomorphan methanesulfonate having a melting point of 206°C.

EXAMPLE 25

2-(2-Thienylmethyl)-2′-hydroxy-5-methyl-9α-ethyl-6,7-benzomorphan and its hydrochloride 2.0 gm (0.005 mol) of 2-(2-thienylmethyl)-2′-methoxy-5-methyl-9α-ethyl-6,7-benzomorphan hydrochloride, prepared from 2-(2-thienylmethyl)-2′-hydroxy-5-methyl-9α-ethyl-6,7-benzomorphan in a manner analogous to that described in Example 27, were admixed with a solution of 10 gm of potassium hydroxide in 75 ml of diethyleneglycol, and the mixture was heated for 5 hours on an oil bath. Thereafter, the reaction mixture was diluted with 450 ml of water, acidified with concentrated hydrochloric acid and then made alkaline with ammonia. The alkaline mixture was extracted three times with 100 ml of chloroform each, and the combined extracts were washed with water, dried with sodium sulfate and evaporated in vacuo. The residue was crystallized with ethanolic hydrochloric acid as described in Example 1, yielding 1.25 gm (69% of theory) of 2-(2-thienylmethyl)-2′-hydroxy-5-methyl-9α-ethyl-6,7-benzomorphan hydrochloride, m.p. 241°–244°C. A sample recrystallized from ethanol/ether had a melting point of 243°–245°C.

EXAMPLE 26

2-(2-Thienylmethyl)-2′-acetoxy-5,9α-dimethyl-6,7-benzomorphan and its hydrochloride 3.5 gm (0.01 mol) of 2-(2-thienylmethyl)-2′-hydroxy-5,9α-dimethyl-6,7-benzomorphan hydrochloride (see Example 20) were shaken with a mixture consisting of 25 ml of water, 10 ml of 2 N ammonia and 50 ml of chloroform, and the chloroform phase was separated, washed with water, dried with sodium sulfate and evaporated in vacuo. The residue was admixed with 50 ml of acetic acid anhydride, the mixture was heated for three hours on a boiling water bath, and thereafter the excess, unreacted anhydride was substantially distilled off in vacuo. The residue was shaken with a mixture consisting of 100 ml of ether, 50 ml of water and ice while gradually adding 2 N ammonia thereto until the mixture remained alkaline, and the ether phase was separated, washed with water, dried with sodium sulfate and evaporated. The residue, the free base 2-(2-thienylmethyl)-2′-acetoxy-5,9α-dimethyl-6,7-benzomorphan, was dissolved in 10 ml of absolute ethanol, the resulting solution was admixed with 2 N of ethanolic hydrochloric acid until it was just barely acid, ether was added to the acidic solution until it began to turn cloudy, and the mixture was allowed to stand overnight in a refrigerator. Thereafter, the crystalline precipitate which had formed was collected by vacuum filtration, washed first with ethanol/ether and then with ether, and dired at 80°C, yielding 3.5 gm (89.5% of theory) of the compound of the formula

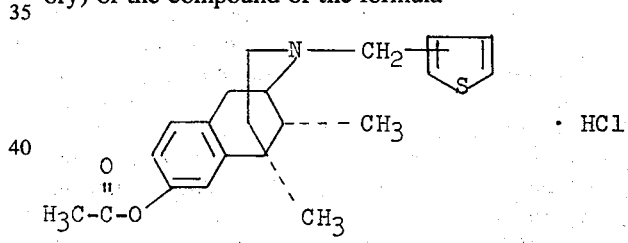

which had a melting point of 192°C. After recrystallization from ethanol/ether it had a melting point of 194°C.

EXAMPLE 27

2-(2-Thienylmethyl)-2′-methoxy-5,9α-dimethyl-6,7-benzomorphan and its hydrochloride 3.5 gm (0.01 mol) of 2-(2-thienylmethyl)-2′-hydroxy-5,9α-dimethyl-6,7-benzomorphan hydrochloride were converted into the free base, as described in Example 26, the base was dissolved in 25 ml of tetrahydrofuran, the solution was admixed with 95 ml of an ethereal solution of 0.02 mol of diazomethane, and the mixture was allowed to stand for 3 days in a closed vessel with calcium chloride in the stopper. Thereafter, the excess diazomethane was decomposed by adding 5 ml of 2 N ethanolic hydrochloric acid, and the mixture was evaporated in vacuo. The residue was dissolved in 50 ml of chloroform, and the resulting solution was extracted with 20 ml of 2 N sodium hydroxide, washed twice with water, dried with sodium sulfate and evaporated in vacuo. The residue, 2-(2-thienylmethyl)-2′-methoxy-5,9α-dimethyl-6,7-benzomorphan, was dissolved in a little ethanol by adding 5 ml of 2 N ethanolic hydrochloric acid, and ether was added to the solution until it became cloudy. The crystalline precipitate formed thereby was collected, washed with ether and dried at 80°C, yielding 2.0 gm (55% of theory) of the compound of the formula

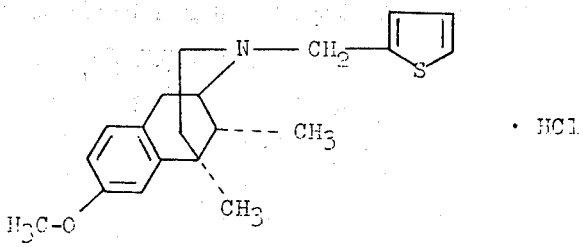

having a melting point of 213°–216°C which remained unchanged after recrystallization from ethanol/ether.

The compounds of the present invention, that is, those embraced by formula I above and their non-toxic, pharmacologically acceptable acid addition salts, have useful pharmacodynamic properties. More particularly, the compounds according to the present invention exhibit opiate antagonistic, non-narcotic analgesic and antitussive activities in warm-blooded animals, such as mice and rats.

For pharmaceutical purposes the compounds according to the present invention are administered to warm-blooded animals perorally, enterally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective analgesic and antitussive dosage unit of the compound according to the present invention is from 0.166 to 5.0 mgm/kg body weight, preferably 0.83 to 2.5 mgm/kg body weight.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 28

Tablets

The tablet composition is compounded from the following ingredients:

| | |
|---|---|
| 2-(2-Thienylmethyl-2'-hydroxy-5,9α-dimethyl-6,7-benzomorphan | 50.0 parts |
| Lactose | 95.0 " |
| Corn starch | 45.0 " |
| Colloidal silicic acid | 2.0 " |
| Soluble starch | 5.0 " |
| Magnesium stearate | 3.0 " |
| Total | 200.0 parts |

Preparation:

The benzomorphan compound is intimately admixed with the lactose and the corn starch, the mixture is moistened with an aqueous 10% solution of the soluble starch, the moist mass is forced through a 1 mm-mesh screen, the resulting granulate is dried at 40°C, the dry granulate is admixed with the colloidal silicic acid, and the composition is compressed into 200 mgm-tablets in a conventional tablet making machine. Each tablet contains 50 mgm of the benzomorphan compound and is an oral dosage unit composition with effective analgesic and antitussive actions.

EXAMPLE 29

Coated Pills

The pill core composition is compounded from the following ingredients:

| | |
|---|---|
| (−)-N-(2-Thienylmethyl)-3-hydroxy-morphinan | 75.0 parts |
| Lactose | 100.0 " |
| Corn starch | 65.0 " |
| Colloidal silicic acid | 2.0 " |
| Soluble starch | 5.0 " |
| Magnesium stearate | 3.0 " |
| Total | 250.0 parts |

Preparation:

The ingredients are compounded in the same manner as in Example 28, and the composition is compressed into 250 mgm-pill cores which are subsequently coated with a thin shell consisting essentially of a mixture of sugar, talcum and gum arabic and finally polished with beeswax. Each coated pill contains 75 mgm of the morphinan compound and is an oral dosage unit composition with effective analgesic and antitussive activities.

EXAMPLE 30

Suppositories

The suppository composition is compounded from the following ingredients:

| | |
|---|---|
| (+)-N-(2-Thienylmethyl)-3-hydroxy-morphinan | 50.0 parts |
| Lactose | 250.0 " |
| Suppository base (e.g. cocoa butter) | 1400.0 " |
| Total | 1700.0 parts |

Preparation:

The benzomorphan compound is intimately admixed with the lactose, and the mixture is blended with the aid of an immersion homogenizer into the suppository base which had previously been melted and cooled to about 40°C. 1700 mgm-portions of the composition are poured into cooled suppository molds and allowed to harden therein. Each suppository contains 50 mgm of the morphinan compound and is a rectal dosage unit composition with effective analgesic and antitussive actions.

EXAMPLE 31

Hypodermic solution

The solution is compounded from the following ingredients:

| | | |
|---|---|---|
| N-(2-Thienylmethyl)-3-hydroxy-morphinan-methanesulfonate | | 75.0 parts |
| Sodium chloride | | 5.0 " |
| Double-distilled water | q.s.ad | 2000.0 " |
| | | by vol. |

Preparation:

The morphinan compound and the sodium chloride are dissolved in the double-distilled water, the solution is filtered until free from suspended particles, and the filtrate is filled under aseptic conditions into 2 cc-ampules which are subsequently sterilized and sealed. Each ampule contains 75 mgm of the morphinan compound, and its contents are an injectable dosage unit composition with effective analgesic and antitussive actions.

EXAMPLE 32

Drop Solution

The solution is compounded from the following ingredients:

| | | |
|---|---|---|
| 2-(2-Thienylmethyl)-2'-hydroxy-5-ethyl-6,7-benzomorphan | | 0.70 parts |
| Methyl p-hydroxy-benzoate | | 0.07 " |
| Propyl p-hydroxy-benzoate | | 0.03 " |
| Demineralized water | q.s.ad | 100.0 " |
| | | by vol. |

Preparation:

The benzomorphan compound and the p-hydroxybenzoates are dissolved in the demineralized water, the solution is filtered, and the filtrate is filled into 100 ml-bottles. 10 ml of the solution contain 70 mgm of the benzomorphan compound and are an oral dosage unit composition with effective analgesic and antitussive actions.

Analogous results are obtained when any one of the other optically active or inactive compounds embraced by formula I or a non-toxic acid addition salt thereof is substituted for the particular benzomorphan or morphinan in Examples 28 through 32. Likewise, the amount of active ingredient in these illustrative examples may be varied to achieve the dosage unit range set forth above, and the amounts and nature of the inert pharmaceutical carrier ingredients may be varied to meet particular requirements.

While the present invention had been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

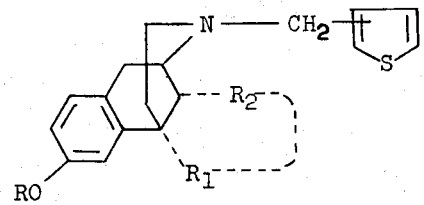

wherein
  R is hydrogen, methyl or acetyl, and
  $R_1$ and $R_2$ are each hydrogen, methyl, ethyl, n-propyl or isopropyl, or, together with each other, 1,4-butylene,
or a non-toxic, pharmacologically acceptable acid addition salt thereof.

2. A compound of claim 1, which is of the formula

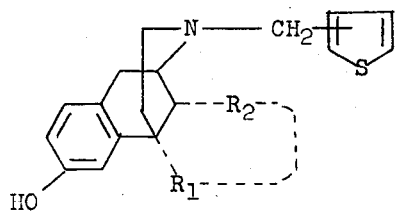

wherein
  $R_1$ and $R_2$ are each hydrogen, methyl, ethyl, n-propyl or isobutyl, or, together with each other, 1,4-butylene,
or a non-toxic, pharmacologically acceptable acid addition salt thereof.

3. A compound of claim 1, which is 2-(2-thienylmethyl)-2'-hydroxy-5,9α-dimethyl-6,7-benzomorphan or a non-toxic, pharmacologically acceptable acid addition salt thereof.

4. A compound of claim 1, which is 2-(3-thienylmethyl)-2'-hydroxy-5,9α-dimethyl-6,7-benzomorphan or a non-toxic, pharmacologically acceptable acid addition salt thereof.

5. A compound of claim 1, which is 2-(2-thienylmethyl)-2'-hydroxy-5-ethyl-6,7-benzomorphan or a non-toxic, pharmacologically acceptable acid addition salt thereof.

6. A compound of claim 1, which is 2-(2-thienylmethyl)-2'-hydroxy-5-methyl-6,7-benzomorphan or a non-toxic, pharmacologically acceptable acid addition salt thereof.

7. A compound of claim 1, which is 2-(2-thienylmethyl)-2'-hydroxy-5-n-propyl-6,7-benzomorphan or a non-toxic, pharmacologically acceptable acid addition salt thereof.

8. A compound of claim 1, which is 2-(2-thienylmethyl)-2'-hydroxy-5-isopropyl-6,7-benzomorphan or a non-toxic, pharmacologically acceptable acid addition salt thereof.

9. A compound of claim 1, which is N-(2-thienylmethyl)-3-hydroxy-morphinan or a non-toxic, pharmacologically acceptable acid addition salt thereof.

10. A compound of claim 1, which is N-(3-thienylmethyl)-3-hydroxy-morphinan or a non-toxic, pharmacologically acceptable acid addition salt thereof.

* * * * *